US012411988B2

(12) United States Patent
Melapudi et al.

(10) Patent No.: US 12,411,988 B2
(45) Date of Patent: Sep. 9, 2025

(54) PRIVACY DRIVEN DATA SUBSET SIZING

(71) Applicant: GE Precision Healthcare LLC, Waukesha, WI (US)

(72) Inventors: Vikram Reddy Melapudi, Bangalore (IN); Chandan Kumar Mallappa Aladahalli, Bengaluru (IN)

(73) Assignee: GE Precision Healthcare LLC, Waukesha, WI (US)

( * ) Notice: Subject to any disclaimer, the term of this patent is extended or adjusted under 35 U.S.C. 154(b) by 215 days.

(21) Appl. No.: 18/451,929

(22) Filed: Aug. 18, 2023

(65) Prior Publication Data
US 2025/0061230 A1 Feb. 20, 2025

(51) Int. Cl.
G06F 21/00 (2013.01)
G06F 21/62 (2013.01)
G06V 10/774 (2022.01)

(52) U.S. Cl.
CPC ........ G06F 21/6254 (2013.01); G06V 10/774 (2022.01)

(58) Field of Classification Search
CPC ............. G06F 21/6254; G06F 21/6245; G06F 18/213; G06F 18/214; G06V 10/774; G06N 20/00; G16H 10/60
See application file for complete search history.

(56) References Cited

U.S. PATENT DOCUMENTS

2023/0386639 A1* 11/2023 Rosenberg ........... A61H 1/0214
2024/0112772 A1*  4/2024 Shelton, IV ........... G16H 40/60

FOREIGN PATENT DOCUMENTS

WO WO-2022256931 A1 * 12/2022 ............. A61B 34/10

OTHER PUBLICATIONS

Fung et al., "maintaining patient privacy by satisfying probabilities to determine anonymity criterion", IEEE Transactions on Knowledge and Data Engineering, vol. 19, No. 5, May 2007.*

(Continued)

Primary Examiner — Morshed Mehedi
(74) Attorney, Agent, or Firm — Amin, Turocy & Watson, LLP

(57) ABSTRACT

Techniques are described for maintaining patient privacy in association with obtaining patient data for machine learning applications. In an example, a method can comprise accessing, by a system comprising a processor, a training dataset associated with a machine learning model, the training dataset comprising of data samples respectively comprising unique characteristics of subjects. The method further comprises determining, by the system, characteristic curve information that correlates different data portions extracted from the data samples to respective probabilities of matching the different data portions to respective ones of the data samples from which they are extracted. The method further comprises controlling, by the system, collection of new data portions extracted from new data samples corresponding to the data samples based on the new data portions conforming to criteria that defines a target data portion, wherein the criteria comprise a probability of the respective probabilities that satisfies an anonymity criterion.

20 Claims, 7 Drawing Sheets

(56) References Cited

OTHER PUBLICATIONS

Olsen, N. | "Implementing Privacy By Design." On-line publication in blog PrivacyPolicy, https://www.privacypolicies.com/blog/privacy-by-design/, last updated Jul. 1, 2022, last accessed Jul. 11, 2023, 20 pages.
Kaissis, G. et al. | "End-to-end privacy preserving deep learning on multi-institutional medical imaging." Nat Mach Intell 3, 473-484 (2021). https://doi.org/10.1038/s42256-021-00337-8, 12 pages.
Devaux, E. | "What is Differential Privacy: definition, mechanisms, and examples." On-line publication in Statice by Anonos, https://www.statice.ai/post/what-is-differential-privacy-definition-mechanisms-examples, published Dec. 21, 2022, 18 pages.
Kaissis, G. et al. | "Secure, privacy-preserving and federated machine learning in medical imaging." Nat Mach Intell 2, 305-311 (2020). https://doi.org/10.1038/s42256-020-0186-1, 7 pages.

* cited by examiner

PRIVACY DRIVEN DATA SUBSET SIZING

TECHNICAL FIELD

This application relates to techniques for maintaining patient privacy in association with obtaining patient data for machine learning applications.

BACKGROUND

Machine learning (ML) models are used in many medical image processing and analysis tasks like organ segmentation, anomaly detection, diagnosis classification, risk prediction, temporal analysis, image reconstruction, and so on. However, one of the fundamental problems in data-driven based machine learning approaches is that the final model inferencing capability is limited by the scope of the training data used to develop the model. To improve these models continuously over time, it is necessary to retrain and update the models to improve their performance based on feedback regarding model errors or failure modes observed in actual deployment environments (e.g., post initial training and development). It is often not possible to understand the failure modes without obtaining the input patient imaging data processed and/or generated by the models in the deployment environment. However, obtaining the deployment site patient imaging data can be difficult as there are often contractual restrictions and privacy issues that prohibit medical image data sharing between the model development site (i.e., the vendor site) and the model deployment site (e.g., the client site).

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later. In one or more embodiments, systems, computer-implemented methods, apparatus and/or computer program products are described that facilitate maintaining patient privacy in association with obtaining patient data for machine learning applications.

According to an embodiment, a system is provided that comprises a memory that stores computer-executable components, and a processor that executes the computer-executable components stored in the memory. The computer-executable components can comprise an assessment component that accesses a training dataset associated with a machine learning model, the training dataset comprising data samples respectively comprising physical characteristics of subjects. The assessment component further determines characteristic curve information that correlates different data portions extracted from the data samples to respective probabilities of matching the different data portions to respective ones of the data samples from which they are extracted, wherein the different data portions respectively comprise different portions of the physical characteristics. The computer-executable components further comprise a collection component that controls collection of new data portions extracted from new data samples corresponding to the data samples based on the new data portions being associated with a probability of the respective probabilities satisfies an anonymity criterion.

In one or more embodiments, the computer-executable components can further comprise a selection component that selects a target data portion of the different data portions based on the target data portion being associated with the probability that satisfies the anonymity criterion, and wherein the collection component controls the collection of the new data portions based on the new data portions conforming to criteria that defines the target data portion. For example, in various implementations the new data samples comprise runtime data samples processed by the machine learning model by an external system.

In some embodiments, elements described in connection with the disclosed systems can be embodied in different forms such as a computer-implemented method, a computer program product, or another form.

DETAILED DESCRIPTION

Figure 1:
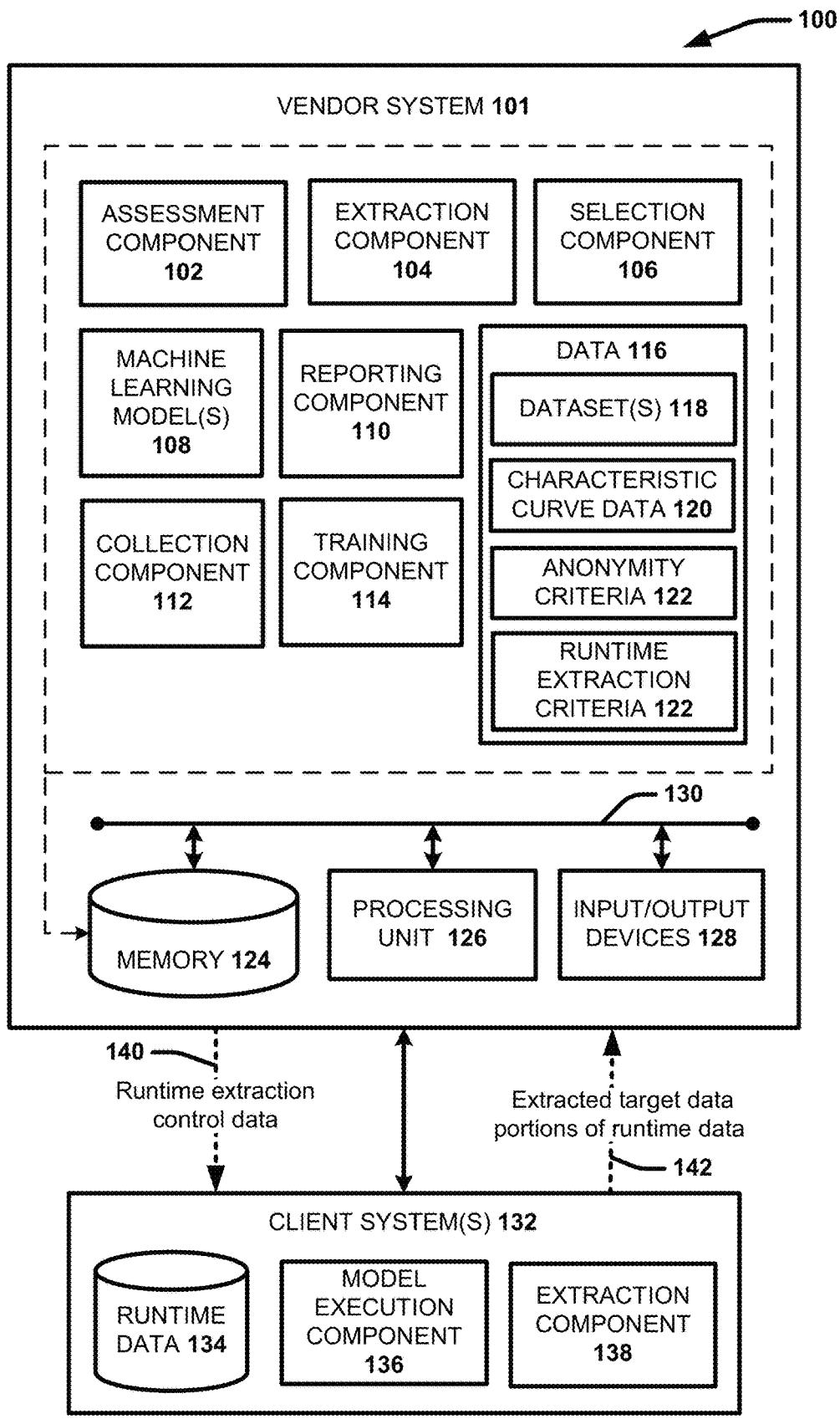
FIG. 1 presents a block diagram of an example system that facilitates maintaining patient privacy in association with obtaining patient data for machine learning (ML) applications, in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section, Summary section or in the Detailed Description section.

The subject disclosure provides systems, computer-implemented methods, apparatus and/or computer program products that facilitate maintaining patient privacy in association with obtaining patient data for machine learning applications.

As noted in the Background Section, the data-driven nature of ML models leads to challenges during the inferencing stage. In particular, one of the fundamental problems in data-driven based machine learning approaches is that the final model inferencing capability is limited by the scope of the training data used to develop the model. For example, in various domains, AIs models are often trained and developed by a particular model development entity, such as a vendor that develops ML models for usage by multiple client systems. For instance, in the healthcare domain, the vendor often includes a software development system that specializes in developing ML tools for healthcare systems, such as hospitals, medical imaging centers, and the like. In accordance with this example, the healthcare system (e.g., the hospital, the medical imaging center, etc.) corresponds to the client system. The term "vendor", "vendor site", "vendor system" or variants thereof is generally used to refer to the entity or system that generates, updates and provides ML applications (e.g., models) to one or more client systems for usage thereof. The term "client", "client site", "client system," or variants thereof is generally used herein to refer to the client system that receives and employs the ML applications provided by the vendor system in the field.

In accordance with the above-described vendor-client system architecture for ML model development and deployment, the scope of the vendor created model is limited by the training data used by the vendor. Depending on the nature of the model and the data being processed, it can be very difficult if not impossible for the vendor training data to be comprehensive of all the variations the model will encounter when deployed in the field. For example, a model trained on clinical data from one hospital may not perform as well on the same type of data from another hospital. For example, as applied to a medical image inferring model trained to perform an inferencing task on medical images, the model development system does not have access to every possible medical image ever taken in the world and new medical images and features will constantly evolve as the patients and acquisition technologies evolve over time. Accordingly, techniques for regularly monitoring the performance of a deployed model at a client site and updating the model to the particular nuances and variations in the data at the client site over time are crucial to the successful integration of ML models for real-world applications in medical domain (and many other domains).

To improve these models continuously over time, it is necessary to retrain and update the models to improve their performance based on feedback regarding model errors or failure modes observed in actual deployment environments (e.g., post initial training and development). As applied to the medical domain, it is often not possible to understand the failure modes without obtaining the patient data processed and/or generated by the models in the deployment environment. However, obtaining the deployment site patient data can be difficult, as there are often contractual restrictions and privacy issues that prohibit patient data sharing between the vendor site and the client site.

The disclosed techniques address this problem by using techniques to obtain portions of the patient data processed and/or generated by the models in the deployment environment, wherein the particular portions that are obtained have been determined to ensure a probability of uniquely identifying the respective patients from which the data was obtained is below a threshold. The particular threshold may be mandated by regulatory bodies and/or required by legal and compliance functions and can vary for different use cases. For example, as applied to medical images, the disclosed techniques can be used to obtain portions of medical images, wherein each of the portions include a subset of pixels extracted from the original image (e.g., a cropped portion of the original image).

Of particular importance, the disclosed subject matter provides techniques to determine the specific portion of the patient data that can ensure the probability of uniquely identifying the respective patients to which the data pertains is below a threshold. For example, as applied to medical images, the specific portion of may be defined by a particular subset of pixels taken from the original image, wherein the subset can be defined based on a particular number of pixels included in the subset, among other criteria (e.g., a specific region or regions of the image, and other parameters). For instance, a pixel subset size constrained by a single pixel would be completely anonymous as the ability to identify the particular image and/or corresponding patient from which the image was captured would be impossible from a single pixel. In this regard, as the number of pixels in the portion of the image is increased, the probability of identification of the subject depicted in the original image typically increases. With medical image data this problem is more acute since medical images from various modalities tend to uniquely reflect the physical and anatomical characteristics of the subjects.

To facilitate determining the specific portion of the patient data that can ensure the probability of uniquely identifying the respective patients to which the data pertains is below a threshold, in one or more embodiments, the disclosed techniques provide a method for determining the transfer function from different candidate data portions extracted from respective training data samples to the probability of identification of the corresponding training data samples from which they were extracted. The training data samples can correspond to training data samples used to train a ML model to perform a particular inferencing task. The transfer function can then be used to select the particular data portion of the different candidate data portions associated with a probability of identification that satisfies the desired threshold. Once selected, the criteria that defines the particular data portion, (e.g., a particular pixel subset size, among other criteria), can be used to extract the corresponding data portion from new patient data samples corresponding to the training data samples, such as new data samples processed by a trained version of the ML in a deployment environment (e.g., a client site).

The criteria defining the different data portions can vary based on the type of the training data samples and the particular portion of the training data samples of interest. For example, as applied to medical images, the particular portion of the medical images of interest can vary based on the particular ML application for which the training data samples are used (e.g., the particular inferencing task of an ML model trained on the training data samples). For instance, the particular portion of interest may be constrained relative to one or more target anatomical features depicted in the medical images of relance to the ML application. The disclosed techniques can also be applied to training data samples comprising other types of patient data (other than medical image data), describing personal information of patients, such as clinical report data, patient electronic health record data, radiology report data, physiological parameters, and the like. In addition, although the disclosed techniques are described with respect to patient data and ensuring anonymity of patients using extracted portions of the patient data, the disclosed techniques can be extended to other domains and datasets involving privacy concerns. For example, the disclosed techniques can be applied to any type of dataset that comprises data samples respectively comprising unique characteristics of entities subject to privacy concerts, such people, corporations, organizations, and the like. The unique characteristics can include any type of information that may uniquely identify the corresponding entity, such as but not limited to, physical characteristics, physiological characteristics, behavioral characteristics, unique identifiers (e.g., names, account numbers, device identifiers, phone numbers, etc.), unique demographic information (e.g., location/address, age, gender, etc.), business records, transaction records, and the like.

The term "medical image," "medical image data," and the like is used to refer to image data that depicts one or more anatomical regions of a patient. Reference to a medical image or medical image data herein can include any type of medical image associated with various types of medical image acquisition/capture modalities. For example, medical images can include (but are not limited to): radiation therapy (RT) images, X-ray (XR) images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. Medical images can also include synthetic versions of native medical images such as augmented, modified or enhanced versions of native medical images, augmented versions of native medical images, and the like generated using one or more image processing techniques. In some embodiments, the term "image data" can include the raw measurement data (or simulated measurement data) used to generate a medical image (e.g., the raw measurement data captured via the medical image acquisition process).

The terms "algorithm" and "model" are used herein interchangeably unless context warrants particular distinction amongst the terms. The terms "artificial intelligence (AI) model" and "machine learning (ML) model" are used herein interchangeably unless context warrants particular distinction amongst the terms. Reference to an AI or ML model herein can include any type of AI or ML model, including (but not limited to): deep learning models, neural network models, deep neural network models (DNNs), convolutional neural network models (CNNs), generative adversarial neural network models (GANs) and the like. An AI or ML model can include supervised learning models, unsupervised learning models, semi-supervised learning models, combinations thereof, and models employing other types of ML learning techniques. An AI or ML model can include a single model or a group of two or more models (e.g., an enable model or the like).

The term "image inferencing model" is used herein to refer to an AI/ML model adapted to perform an image processing or analysis task on image data. The image processing or analysis task can vary. In various embodiments, the image processing or analysis task can include, (but is not limited to): a segmentation task, an image reconstruction task, an object recognition task, a motion detection task, a video tracking task, an optical flow task, and the like. The image inferencing models described herein can include two-dimensional (2D) image processing models as well as three-dimensional (3D) image processing models. The image processing model can employ various types of AI/ML models (e.g., deep learning models, neural network models, deep neural network models, DNNs, CNNs, GANs, etc.). The terms "image inferencing model," "image processing model," "image analysis model," and the like are used herein interchangeably unless context warrants particular distinction amongst the terms.

The term "image-based inference output" is used herein to refer to the determination or prediction that an image processing model is configured to generate. For example, the image-based inference output can include a segmentation mask, a reconstructed image, an adapted image, an annotated image, a classification, a value, or the like. The image-based inference output will vary based on the type of the model and the particular task that the model is configured to perform. The image-based inference output can include a data object that can be rendered (e.g., a visual data object), stored, used as input for another processing task, or the like. The outputs can be in different formats, such as for example: a Digital Imaging and Communications in Medicine (DICOM) structured report (SR), a DICOM secondary capture, a DICOM parametric map, an image, text, and/or JavaScript Object Notation (JSON). The terms "image-based inference output", "inference output" "inference result" "inference", "output", "result," "predication", and the like, are used herein interchangeably unless context warrants particular distinction amongst the terms.

As used herein, a "medical imaging inferencing model" refers to an image inferencing model that is tailored to perform an image processing/analysis task on medical image data. For example, the medical imaging processing/analysis task can include (but is not limited to): disease/condition classification, disease region segmentation, organ segmentation, disease quantification, disease/condition staging, risk prediction, temporal analysis, anomaly detection, anatomical feature characterization, medical image reconstruction, and the like. The terms "medical image inferencing model," "medical image processing model," "medical image analysis model," and the like are used herein interchangeably unless context warrants particular distinction amongst the terms.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 presents a block diagram of an example, non-limiting system 100 that facilitates maintaining patient privacy in association with obtaining patient data for ML applications, in accordance with one or more embodiments of the disclosed subject matter. System 100 includes a vendor system 101 and one or more client systems 132. The vendor system 100 and the one or more client systems 132 can respectively include or correspond to one or more computing systems comprising one or more computing devices, machines, virtual machines, computer-executable components, datastores, and the like that may communicatively coupled to one another either directly or via one or more wired or wireless communication frameworks. For example, in various embodiments, the vendor system 100 can correspond to a system that provides ML applications and associated services to the one or more client systems 132 via any suitable wireless communication framework (e.g., the Internet of the like) in accordance with a cloud-based computing architecture, a server-client type architecture or the like, examples of which are described with reference to FIG. 7. However, the architecture of system 101 can vary and is not limited to this configuration.

In this regard, embodiments of systems and devices (e.g., system 101, vendor system 100, client system 132, and the like) described herein can include one or more machine-executable (i.e., computer-executable) components or instructions embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. These computer/machine executable components or instructions can be stored in memory (e.g., memory 124) associated with the one or more machines. The memory can further be operatively coupled to at least one processor (e.g., processing unit 126), such that the components can be executed by the at least one processor to perform the operations described. In some embodiments, the memory can include a non-transitory machine-readable medium, comprising the executable components or instructions that, when executed by a processor, facilitate performance of operations described for the respective executable components. Examples of said and memory and processor as well as other suitable computer or computing-based elements, can be found with reference to FIG. 6 (e.g., processing unit 604 and system memory 606 respectively), and can be used in connection with implementing one or more of the systems or components shown and described in connection with FIG. 1, or other figures disclosed herein.

For example, the vendor system 100 can include (or be operatively coupled to) at least one memory 124 that stores computer-executable components and at least one processor (e.g., processing unit 126) that executes the computer-executable components stored in the at least one memory 124. These computer-executable components can include (but are not limited to) assessment component 102, extraction component 104, selection component 106, machine learning models 108, reporting component 110, collection component 112, and training component 114. The memory 124 can also store data 116 that corresponds to data which may be used by and/or generated by the vendor system 101. In various embodiments, this data 116 can include but is not limited to, one or more datasets 118, characteristic curve data 120, anonymity criteria 122 and runtime extraction criteria 122. In other embodiments, one or more of the computer-executable components (e.g., assessment component 102, extraction component 104, selection component 106, machine learning models 108, reporting component 110, collection component 112, and/or training component 114) and/or the elements of the data 116 (e.g., the datasets 118, the characteristic curve data 120, the anonymity criteria 122 and/or the runtime extraction criteria 122) may be stored and/or executed via one or more other computing systems in accordance with a distributed computing architecture. Various configurations are envisioned.

The vendor system 101 can further include one or more input/output devices 128 to facilitate receiving user input and rendering data to users in association with performing various operations described with respect to the machine-executable components (e.g., determining data portion criteria, determining characteristic curve information (i.e., a transfer function) that correlates different candidate data portions of data samples to respective probabilities of matching the different candidate data portions to respective ones of the data samples from which they are extracted, selecting the anonymity threshold, training/refining the one or machine learning models 108, etc.). In this regard, any information received by, generated by and/or accessible to the vendor system 101 can be presented or rendered to a user via a suitable output device, such as a display, a speaker or the like, depending on the data format. Suitable examples of the input/output devices 128 are described with reference to FIG. 6 (e.g., input devices 628 and output device 636). The vendor system 101 can further include a system bus 130 that couples the memory 124, the processing unit 126 and the input/output device 128 to one another.

The one or more client systems 132 can similarly include (or be operatively coupled to) at least one memory that stores computer-executable components and at least one processor that executes the computer-executable components stored in the at least one memory, input/output devices, as well as other suitable computer or computing-based elements described with reference to FIG. 6, which can be used in connection with implementing features and functionalities of the one or more client systems 132 described herein. These computer or computing-based elements (e.g., the memory, the processing unit, the input/output devices, etc.) are not shown for the one or more client systems 132 as illustrated in FIG. 1 for sake of brevity. In various embodiments, the one or more client systems 132 can include or be operatively coupled to runtime data 134 and computer-executable components including (but not limited to) model execution component 136 and extraction component 138.

With reference to the vendor system 101, in one or more embodiments, the assessment component 102 can access and evaluate datasets 118 respectively comprising a plurality of data samples that respectively comprise information (e.g., characteristic curve data 120) that uniquely represents respective subjects (e.g., patients, people, companies, etc.) and determine characteristic curve information for the respective datasets 118 that correlates different data portions extracted from the data samples to respective probabilities of matching the different data portions to respective ones of the data samples from which they are extracted. In this regard, each of the different data portions can comprise different portions or subsets of the unique characteristics of subjects. To this end, the respective probabilities correspond to respective probabilities of being able to determine the identities of the corresponding subjects (e.g., patients, people, companies, etc.) to which the different data portions are associated.

For example, in some embodiments as applied to people, the information that uniquely represents the respective entities can comprise unique physical characteristics of respective individuals, such as unique physical characteristics of the respective individuals depicted in images captured of the individuals (e.g., medical images and/or non-medical images). As applied to medical images, the unique characteristics are not limited to the image features included in the images themselves, but can additionally or alternatively comprise unique information associated with the medical images (e.g., as metadata or the like), such as but not limited to, information describing acquisition parameters (e.g., including both physics and the operator behavior), patient information (e.g., describing clinical and non-clinical attributes), findings information regarding a clinical interpretation of the medical images (e.g., extracted from radiology reports, associated with the medial images as metadata, etc.), and measurement data describing or indicating relative sizes and/or positions of anatomical features depicted. In another example as applied to people, the unique characteristics can include biometric characteristics. In another example as applied to people, the unique characteristics can comprise characteristics of respective individuals related to their physiological state, mental state, voice, gait, behavior, demographics (e.g., location, age, gender, occupation, etc.), medical history, web-browsing activity, preferences, and any other type of information that may be gathered about an individual subject to privacy concerns.

In this regard, the particular type of unique and/or privacy constrained information included in a dataset 118 evaluated by the assessment component 102 can vary so long as each data sample included in the same dataset includes the same or similar type of content, with variances between the data samples based on the particular subject (e.g., person, patient, company) to which they pertain. The disclosed techniques further assume data samples included in the same dataset represent different subjects (e.g., different people, different patients, different companies, etc.). For example, each data sample may represent a different subject. In other implementations, some of the data samples may represent the same subject (e.g., different medical images taken from the same patient). An example dataset conforming to these criteria includes a set of medical images of the same capture modality and depicting the same anatomical region yet captured from different patients. Another example dataset conforming to these criteria include a dataset with data samples respectively representing different subjects, wherein each data sample comprises the same set of parameters (e.g., physical parameters, physiological parameters, medical history parameters, behavioral parameters, etc.), and wherein the values of the parameters for each data sample vary based on the respective subjects which they represent.

Figure 2:
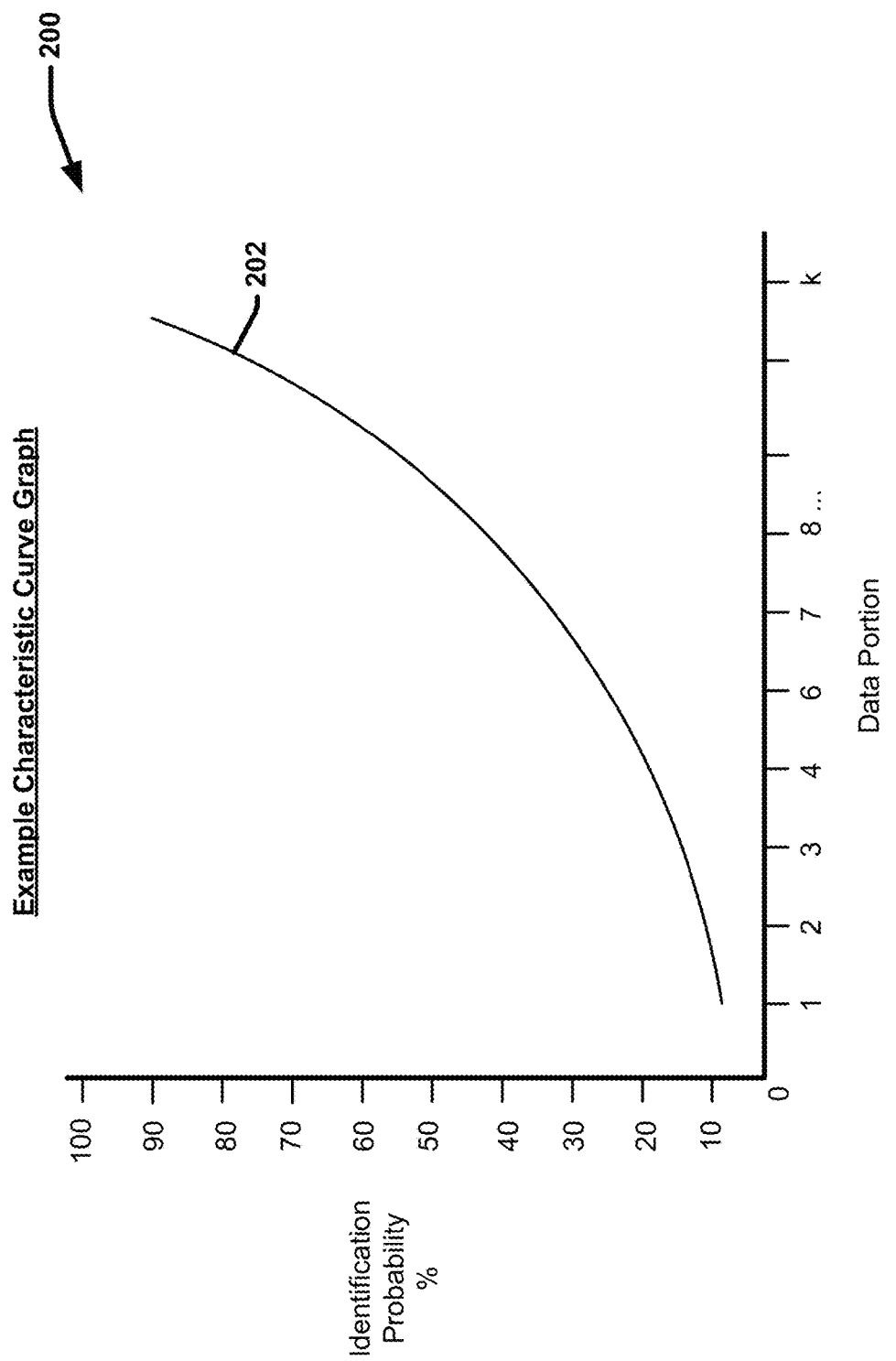
FIG. 2 illustrates an example characteristic curve that correlates different data portions to identification probabilities, in accordance with one or more embodiments of the disclosed subject matter.

FIG. 2 illustrates an example characteristic curve graph 200 that correlates different data portions to different identification probabilities, in accordance with one or more embodiments of the disclosed subject matter. With reference to FIGS. 1 and 2, as illustrated in FIG. 2, the characteristic curve graph 200 plots different data portions 1-$k$ extracted from a dataset 118 evaluated by the assessment component 102 relative to different identification probabilities, which in this example range from 0% (e.g., corresponding to a zero percent probability of identification) to 100% (e.g., corresponding to a 100% probability of identification). The different identification probabilities correspond to respective probabilities of matching the different data portions 1-$k$ to respective ones of the data samples from which are extracted. It should be appreciated that the probability scale applied in FIG. 2 is merely exemplary and that various other scales may be used (e.g., including any number of values between 0 and 1 for instance).

In this regard, the different data portions 1-$k$ respectively correspond to different portions of data extracted (e.g., via the extraction component 104) from respective data samples included in a dataset 118 being evaluated. The number of different data portions "k" evaluated can vary. The different data portions 1-$k$ can respectively be defined by different criteria that control the amount and type of data content included in the different data portions, which can vary depending on the type and content of the respective data samples. For example, in some embodiments, as applied to medical images, the criteria that defines the different data portions can be different subsets of pixels respectively corresponding to different amounts of pixels extracted from each of the medical images. For instance, the different data portions 1-$k$ can include a first subset size defined by a first number pixels (e.g., corresponding to data portion 1), a second subset size defined by a second number of pixels greater than first number (e.g., corresponding to data portion 2), a third subset size defined by a third number of pixels greater than the second number (e.g., corresponding to data portion 3), and so on. In accordance with this example, the characteristic curve 202 plots the probability of identification determined for each subset size. For example, the probability of identification associated with data portion 1, corresponding to the lowest pixel subset size (i.e., the first pixel subset size) as illustrated in graph 200 is 10%. What this means is that for any medical image included in the dataset evaluated (and for any additional medical images corresponding to the medical images, such as new medical images of the same modality an depicting the same anatomical region), when the portion of the medical image extracted is equal to the lowest pixel subset size, the probability of identification of the patient from which the medical image was captured is 10%.

In this regard, the information represented by graph 200 corresponds to the characteristic curve information (e.g., corresponding to characteristic curve data 120) that can be determined by the assessment component 102 for a dataset 118. For example, the characteristic curve data 120 can include the characteristic curve information determined by the assessment component for each dataset 118 evaluated. This information can identify the specific dataset and includes the parameters that define each data portion of the different data portions 1-$k$, such as the specific amounts of pixels defining each data portion in accordance with the medical image example described above. This information further includes the respective identification probabilities determined for each data portion.

Figure 3:
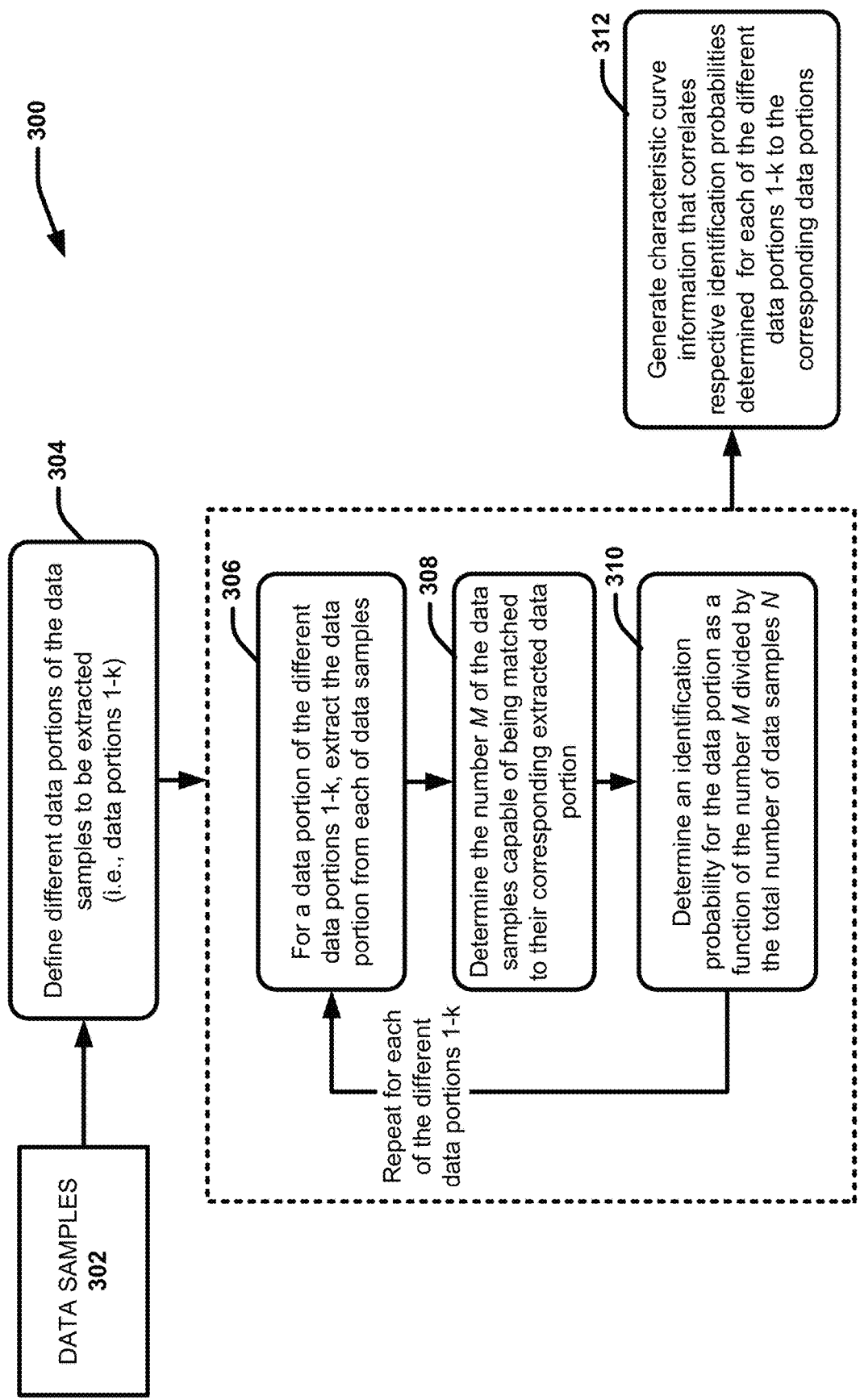
FIG. 3 illustrates a flow diagram of an example process for determining characteristic curve information that correlates different data portions to identification probabilities, in accordance with one or more embodiments of the disclosed subject matter.

FIG. 3 illustrates a flow diagram of an example process 300 for determining characteristic curve information (e.g., corresponding to that represented by example characteristic curve 202) that correlates different data portions to identification probabilities, in accordance with one or more embodiments of the disclosed subject matter. With reference to FIGS. 1-3, process 300 is illustrated in association with evaluating data samples 302 that form a dataset 118. The total number of the data samples 302 is represented as N, which can vary. As noted above, the dataset 118 can include essentially any dataset comprising a plurality of data samples 302 that respectively include unique information for different subjects (e.g., patients, people, companies, etc.) and associated with privacy constraints (e.g., personal information, patient information and the like), wherein each of the data samples 302 respectively include the same type and amount of content yet corresponding to different subjects (e.g., medical images captured for different patients of the same modality and depicting the same anatomical region, text data samples for different patients respectively comprising the same physiological input parameters, etc.).

In accordance with process 300, at 304, the assessment component 102 can define the different data portions (i.e., data portions 1-$k$) of the data samples 302 to be extracted. For instance, in furtherance to the above example wherein the data samples include medical images and the different data portions correspond to different pixel subset sizes, at 304, the assessment component 102 can define the different pixel subset sizes. In some embodiments, the specific criteria used to define the different data portions for a dataset being evaluated can be predefined (and stored in memory 124 or the like). In other embodiments, the specific criteria used to define the different data portions can be provided via user input. In other embodiments, the specific criteria used to define the different data portions can be determined by the assessment component 102 based on analysis of the type and content of the data samples 302, the purpose for with the data samples and/or the extracted portions will be used, and various other factors. Techniques for determining and/or defining the criteria used to define the different data portions are described in greater detail below. By way of example, process 300 is described as applied to the data samples comprising medical images, wherein the criteria defining the different data portions 1-k is different pixel amounts.

At 306 for each data portion of the different data portions 1-k, the extraction component 104 can extract the data portion from each of the data samples 302. For example, as applied to the data samples 302 being medical images and the different data portions 1-k being different pixel subset sizes, at 406, for data portion 1 of graph 200 as corresponding to a first pixel subset size, the extraction component 104 can extract a subset of pixels of the first pixel subset size from each medical image. This results in generation of a first group of extracted image portions, each image portion having the first pixel subset size. In some embodiments, depending on the number N of data samples 302, the extraction component 104 can evaluate a representative subset of the data samples, comprising a reduced number of the data samples, thereby reducing computational processing time. With these embodiments, the data samples included in the representative subset can be selected randomly. In some embodiments, the extracted data portions can be stored in memory 124 (e.g., with their corresponding dataset 118) along with the corresponding criteria that defines each data portion, and the corresponding data samples from which they were extracted, At 308, the assessment component 102 can determine the number M of the data samples capable 302 of being matched to their corresponding extracted portion (or vice versa). To facilitate this end, the assessment component 102 can employ one or more suitable matching algorithms tailored to the type of the data samples. For example, as applied to images, in some embodiments, the assessment component 102 can determine whether extracted image portions can be matched to respective ones of the images from which they were extracted using a standard image similarity metric, such as a structural similarity index (SSIM), an entropy metric, a means square error (MSE) metric, a mean absolute error (MAE), or the like. With these embodiments, the assessment component 102 can compare the extracted image portion to the original image from which it was extracted and compute a similarity measure (e.g., an SSIM measure, a MSE measure, etc.) that represents level of similarity between the extracted image portion (Ii) and the original image (Iq). The assessment component 102 can further apply a predefined threshold similarity measure to determine whether the computed similarity measure correlates to a match or not. For instance, the assessment component 102 can apply a binary match value (m) of 1 to the image portion/original image pair when the extracted image portion (Ii) and the original image (Iq) are considered matching/similar (e.g., as function of the similarity metric relative to the threshold) and a binary match value (m) of 0 when the extracted image portion (Ii) and the original image (Iq) are considered not matching.

The assessment component 102 can similarly compare extracted data portions to corresponding data samples from which they were extracted as applied to data samples comprising non-image data (e.g., text data, signal data, or the like) respectively comprising sets of parameters corresponding to unique characteristics (e.g., physiological characteristics, physical characteristics, health record parameters, demographic parameters, etc.) of subjects (e.g., patients, people, businesses, etc.). For example, the non-image parameters of such data samples can be evaluated as an array or sequence of values in a specific order, such as a sequence corresponding to {age, BMI, height, weight, gender, race, region, etc.}. There are several mathematical ways of determining similarity between two such sequences of values (e.g., one corresponding to the original sequency and the other corresponding to an extracted portion of the original sequence), such as using vector norms like squared sum, absolute sum, maximum difference value, and others. Similarly, image data can be thought of as specific information data wherein the sequence is related to the position of the pixel.

At 310, the assessment component 102 can determine an identification probability for the data portion as a function of the number M divided by the total number of data samples N (or the representative subset amount Ns as applicable). For example, in some embodiments, the assessment component 102 can determine the identification probability for each data portion evaluated in accordance with the following Identification Probability Equation:

Identification Probability Equation $$C(p) = 1 - \frac{1}{N}\sum_{q=1}^{N_p}\left(\frac{\sum_{i=1}^{N_p}M(I_i, I_q)}{N_p}\right).$$

In accordance with this Identification Probability Equation, C(p) is the identification probability determined for specific data portion p of the different data portions, Np is the total number of data samples evaluated for the given data portion (e.g., which may correspond to all of the data samples N or a representative subset of the data samples), and M (Ii, Iq) represents the amount of matching data portion to corresponding data samples pairs (Ii, Iq).

The assessment component 102 and the extraction component 104 can further repeat steps 306, 308 and 310 for each of the different data portions 1-k to determine the respective identification probabilities for each of the different data portion 1-k. At 312, the assessment component 102 can generate characteristic curve information that correlates respective identification probabilities determined for each of the different data portions 1-k to the corresponding data portions. In this regard, the assessment component 102 can aggregate and index the respective identification probabilities determined for each of the different data portions 1-k generated in accordance with the with steps 306, 308 and 310. In some embodiments, at 312, the assessment component 102 can generate a characteristic curve graph corresponding to graph 200 that provides a visual representation of the characteristic curve information determined for the dataset evaluated. The characteristic curve graph can be included in the corresponding characteristic curve information (e.g., characteristic curve data 120) for the corresponding dataset.

With reference to FIG. 1 in view of FIGS. 2 and 3, in various embodiments, the datasets 118 evaluated by the assessment component 102 can include or correspond to training datasets respectively associated with one or more machine learning (ML) models 108. For example, the training datasets can include respective training datasets comprising the training data samples that were used to train corresponding ML models of the ML models 108 and/or that may be used to train the corresponding ML models. In this regard, the training data samples can correspond to the input data samples that are respectively processed by the corresponding ML models to generate a particular inference output, such as an inference output regarding an assessment of a medical condition reflected in a medical image, as applied to one example in which the training data samples include medical images.

The particular inferencing tasks of the machine learning models 108 and the type of training data samples included in the respective training datasets can vary. For example, as applied to the medical domain, the machine learning models 108 can include one or more models adapted to perform an inferencing task related disease/condition classification, disease region segmentation, organ segmentation, disease quantification, disease/condition staging, risk prediction, temporal analysis, anomaly detection, anatomical feature characterization, medical image reconstruction, and the like. With these implementations, the corresponding training datasets processed (e.g., as input) by the respective machine learning models 108 can include data samples respectively comprising unique characteristics of respective patients, such as but not limited to, physical characteristics (e.g., physical/anatomical characteristics, physiological characteristics), behavioral characteristics, mental health characteristics, demographic characteristics (e.g., age, location, gender, ethnicity), and the like. For example, the data samples can include essentially any type of relevant information associated with a patient that may be subject to privacy concerns, such as but not limited to: medical imaging data, laboratory data, medical history information (e.g., electronic health record information), medication data, clinical report data (e.g., radiology reports, laboratory reports, clinical assessment reports, etc.), clinician notes data, appointment scheduling data, treatment plan/path data, and the like.

In various example implementations of these embodiments, the input data processed by the ML models 108 in the medical domain include medical image data (i.e., the one or more machine learning models 108 can include or correspond to medical image inferencing models). With these implementations, the corresponding training datasets processed by the respective ML models 108 can include medical images. In some implementation, each data sample can correspond to a single medical image. In other implementations, each data sample can correspond to a set of medical images captured from the same patient, such as a set of images acquired during a single imaging study (e.g., a set of XRs, a series of CT or MRI images, and the like).

However, the disclosed techniques are not limited to medical images (or non-medical images as applied to non-medical domains). In this regard, in other embodiments, the respective training data samples included in a training dataset (e.g., of datasets 118) evaluate by the assessment component 102 can additionally, or alternatively, include text data, signal data, audio data, and other data format types that include unique characteristics of respective patients (e.g., physical/anatomical characteristics, physiological, behavioral characteristics, mental health characteristics, demographic characteristic, medical history characteristics, etc.).

In accordance with some embodiment in which the datasets 118 include training datasets associated with ML models 108, the characteristic curve data 120 determined for the respective training datasets by the assessment component 102 can be used to determine a target data portion of the different data portions that satisfies a required or preferent anonymity criterion, (i.e., a threshold identification probability). For example, using process 300, the assessment component 102 and the extraction component 104 can determine characteristic curve data 120 for a training dataset associated with a ML model 108 (e.g., a training dataset that was used or may be used to train the ML model 108. With these embodiments, the characteristic curve information will correlate different data portions extracted from the training data samples to respective probabilities of matching the different data portions to respective ones of the data samples from which they are extracted, wherein the respective probabilities correspond to respective identification probabilities of being able to determine the identities of the corresponding subjects (e.g., patients, people, companies, etc.) which the different data portions are associated.

To this end, the target data portion can correspond to the particular data portion of the different data portions that can be extracted from the respective training data samples, and/or additional data samples corresponding to the training data samples, and shared with external entities (e.g., one or more client systems 132 or another suitable entity) with an assurance that the probability of identification of respective subjects represented in the extracted data portions satisfies a required or preferred threshold probability. This required or preferred threshold probability is referred to herein as the "anonymity criterion" for a particular dataset. The anonymity criterion, (i.e., a threshold probability), may be mandated by regulatory bodies or required by legal and compliance functions.

In various embodiments, the target data portion determined for a particular training dataset can be applied to collect portions of new data samples corresponding to the training data samples based on the new data portions conforming to the criteria that defines the target data portion (e.g., having a specific pixel subset size or the like). For example, in some embodiments, as applied to a training dataset that was used to train a ML model 108, the new data samples can include runtime data samples (e.g., included in runtime data 134) processed by a trained version of the ML model by an external system, such as one or more client systems 132. With these embodiments, the collected portions of the new data samples from the deployment environment can be used to be used to retrain and update the ML model 108 post deployment. In this regard, the new data samples can include data samples provided by various disparate system and/or entities which may not be authorized or amenable to sharing their data samples with other systems (e.g., vendor system 101, other machine learning systems, etc.) due privacy concerns related to the contents of the data samples (e.g., patient information and the like). Such privacy concerns are significant hindrance with respect to sharing patient data. However, by collecting only a portion of the respective data samples determined to guarantee satisfaction an anonymity criterion accepted by the respective systems (e.g., which can vary for different systems and be tailored to preferences of such systems), such privacy concerns are substantially eliminated. As a result, sharing of data between disparate systems for the usage of continued ML refinement and other ML applications will not be hindered by privacy concerns, which provides a substantial benefit to ML models and other ML applications in the medical domain.

In some embodiments, once the assessment component 102 has determined the characteristic curve data for a particular training dataset used to train an ML model 108, the reporting component 110 can provide the characteristic curve data to any external system that employs the trained version of the ML model to process their corresponding data samples and generate corresponding inference outputs (e.g., the one or more client systems 132 or the like). With these embodiments, the external system can review the characteristic curve data and select a target data portion of the different data portions based on the target data portion being associated with a probability of the respective identification probabilities that satisfies an anonymity criterion desired or required by the external system.

Additionally, or alternatively, once the assessment component 102 has determined the characteristic curve data for a particular training dataset used to train an ML model 108, the selection component 106 can select a target data portion of the different data portions based on the target data portion being associated with a probability of the respective probabilities that satisfies an anonymity criterion applicable to the training dataset (e.g., as predefined and provided in anonymity criteria 122, provided via user input, or the like). As noted above, the anonymity criterion can correspond to a threshold probability that represents a desired or required (low) probability of being able to match the target data portion as extracted from any data sample corresponding to the training data samples to the original data sample from which it was extracted, which corresponds to a probability of being able to determine the identity of the subject from the target data portion in scenarios in which the identity of the subject can be linked to the original image.

In some implementations of these embodiments, the collection component 112 can control the collection of new data portions extracted from new data samples corresponding to the training data samples based on the new data portions conforming to criteria that defines the target data portion. For example, in some embodiments, the collection component 112 (or the reporting component 110) can provide a client system (e.g., of the one or more client system 132) with runtime extraction control data 140 that defines the criteria of the target data portion (e.g., the particular pixel subset size or the like) determined for a particular input dataset applicable for processing by the trained version of the ML model. To this end, the applicable dataset includes a dataset comprising data samples that correspond to the training data samples of training dataset. For example, as applied to a training dataset comprising medical images, the applicable dataset includes medical images having the same parameters (e.g., same capture modality and anatomical region depicted for instance, among others) as the training dataset. The runtime extraction control data 140 can also include information that defines the parameters of the applicable dataset.

In some implementations, the runtime extraction control data 140 can also direct (e.g., request) the client system 132 to extract and provide (e.g., the vendor system 101) data portions conforming to criteria that defines the target data portion from respective data samples included in the runtime data 134 corresponding to the applicable dataset. These extracted data portions are represented in system 100 as extracted target data portions of runtime data 142. With these embodiments, based on reception of the runtime extraction control data 140, the client system 132 can be configured to apply the criteria that defines the target data portion to extract (e.g., via extraction component 138) and provide the extracted target data portions of the runtime data 142 to the vendor system 101. In some embodiments, the training component 114 can further employ the extracted target portions of the runtime data 142 to retrain (e.g., update, refine and improve) the ML model 108, resulting in an optimized version of the ML model 108.

Techniques for controlling the extraction and provision of the extracted target data portions 142 from the runtime data samples associated with the one or more client system 132 can vary and are not limited to the technique described above. For example, in some embodiments, the one or more client systems 132 can include a model execution component 136 that controls application and execution of the trained version of the ML model 108 to the corresponding data samples provided in the runtime data 134. The trained version of the ML model may be stored at the vendor system 101 and accessed as a software as a service (Saas) or stored local at the one or more client systems 132 and executed locally. In either of these embodiments, the model execution component 136 can be configured to extract the target data portions from the runtime data samples in accordance with the runtime extraction control data 140 and provide the extracted target data portions of the runtime data 142 back to the vendor system 101. In other embodiments, the extraction component 138 and/or the extraction component 104 can include or correspond to a configurable plugin software application that is controlled and/or executed by the vendor system 101. With these embodiments, the extraction component 138 and/or the extraction component 104 can be configured to extract the target data portion from the runtime data samples in accordance with the runtime extraction control data 140 and provide the extracted target data portions of the runtime data 142 back to the vendor system 101. Still in other embodiments, the trained version of the ML model 108 can be configured to extract the target data portion from the runtime data samples in accordance with the runtime extraction control data 140 and provide the extracted data portions of the runtime data 142 back to the vendor system 101. Various control strategies are envisioned.

As mentioned above, the criteria or parameters that define different data portions (corresponding to data portions 1-$k$ of FIG. 2) extracted from respective data samples controls the amount and content of the data portions. For example, as applied to images, the criteria may include an amount of pixels, wherein different data portions are defined by different amounts of pixels extracted from the respective images. To this end, the extracted data portions from each image correspond to cropped portions of the image respectively comprising different amounts of pixels. In various embodiments, as applied to images, in addition to the amount of pixels, the criteria that defines the different data portions can also control the location or region of the images from which the pixel subsets are extracted and the geometry of the cropped portions. To this end, the content of a cropped portion of an image as constrained by only a pixel amount will vary depending on the location or region of the image from the cropped portion is taken as well as the geometry of the cropped portion. As the disclosed techniques are directed to extracting portions of data samples of a dataset 118 for the purpose of using the extracted portions for ML model training and other applications, the criteria that defines the different data portions should account for particular portion of the data samples comprising the most relevant content for the usage purpose (e.g., ML model training or another application). For example, as applied to training data sets used to train a medical image inferencing model, wherein the data samples comprise medical images and wherein the extracted target data portions of the medical images (e.g., corresponding to extracted target portions of the runtime data 142) will be used to retrain/update the model (e.g., via training component 114), the extracted target data portions should include the most relevant portions of the medical images to the task of the medical image inferencing model (e.g., disease/condition classification, disease region segmentation, organ segmentation, disease quantification, disease/condition staging, risk prediction, temporal analysis, anomaly detection, anatomical feature characterization, medical image reconstruction, etc.).

In this regard, in various embodiments, the assessment component 102 can define the criteria of the different portions based on target content information that identifies or indicates the particular portion of the data samples comprising the most relevant content for a particular usage purpose (e.g., ML model training or another application). In some implementations, the target content information can be predefined and associated with the dataset 118 and/or the ML model 108 associated with the dataset in implementations in which the dataset was used or will be used to train the ML model. In another implementations, the target content information can be provided to the assessment component 102 via user input (e.g., a user can request target portions of a dataset and define or indicate the target content information in association with the request). For example, as applied to medical images, the user input may include mark-up data applied to one or more sample medical images representing the dataset. The mark-up data can include graphical markups (e.g., bounding boxes, calipers, etc.) indicating the relevant anatomical region or regions of the medical image to be included in the target data portion.

In other embodiments, the assessment component 102 can predict the target content information and/or the criteria defining the different data portions using artificial intelligence (AI). For example, in some implementations, the assessment component 102 can predict the target content information and/or the corresponding criteria defining the different data portions based on analysis of information describing the particular usage purpose (e.g., ML model updating and the specific inferencing task of the model) of the target data portions. In this regard, the assessment component 102 can infer the most relevant portion of portions of a data samples to be extracted and define the criteria of the different data portions accordingly.

In many implementations, the most relevant portions of medical images to a medical image inferencing task will be based on one or more defined target anatomical features of intertest depicted in the medial images (e.g., organs, lesions, bones, soft tissue, etc.). However, it should be appreciated that the most relevant portions of input medical images for a medical image inferencing model can vary depending on the task. In some embodiments, as applied to a dataset of medical images, the assessment component 102 can define the criteria of the different image portions based on target content information defining one or more target anatomical features depicted in the medical images.

For example, in some implementations, the assessment component 102 can root the extraction location of the different data portions relative to the one or more target anatomical features. The assessment component 102 can further constrain the different data portions to include different amounts of pixels extracted relative to the extraction location. For example, the extraction location may correspond a center point and the different data portions can include different cropped portions of the image of different sizes (e.g., pixel amounts) relative to the same center point. In another example, the extraction location may be defined relative to two or more anatomical features depicted in the medical images. For example, the extraction location may include a region of the medical images positioned between two or more anatomical features of interest. In another example, the extraction location may include two or more different regions of a medical image (e.g., a first sub-region relative to a first anatomical feature, a second sub-region relative to a second anatomical feature, etc.). The assessment component 102 can also define the different data portions to be constrained by a specific geometry (e.g., a rectangular geometry, a rectangular geometry of a specific aspect ratio, a circular geometry, a three-dimensional geometry as applied to three-dimensional images, etc.). In some implementations, the specific geometry can be based on and/or correspond to the geometry of a target anatomical feature (e.g., the geometry/contour of a particular organ, or the like).

In some implementations, the assessment component 102 can also evaluate a dataset 118 in accordance with different criteria defining the different data portions and generated separate characteristic curve information for each of the different criteria. For example, the assessment component 102 can generate first characteristic curve information for a medical image dataset that evaluates first different data portions as defined relative to a first anatomical feature, and generate second characteristic curve information that evaluates second different data portions relative to a second anatomical feature.

In addition, although example embodiments of the disclosed techniques are described with respect to patient data and ensuring anonymity of patients using extracted portions of the patient data, the disclosed techniques can be extended to other domains and datasets involving privacy concerns. For example, the disclosed techniques can be applied to any type of dataset that comprises data samples respectively comprising unique characteristics of entities subject to privacy concerns, such people, corporations, organizations, and the like. The unique characteristics can include any type of information that may uniquely identify the corresponding entity, such as but not limited to, physical characteristics, physiological characteristics, behavioral characteristics, unique identifiers (e.g., names, account numbers, device identifiers, phone numbers, etc.), unique demographic information (e.g., location/address, age, gender, etc.), business records, transaction records, and the like. In this regard, the criteria that defines the different data portions and/or the most relevant content of the different data portions for which the different subsets are based can vary and be tailored for different usage scenarios.

Furthermore, the datasets evaluated by the assessment component 102 are not restricted to training datasets tied to machine learning models. In this regard, the dataset evaluated by the assessment component 102 can include datasets that may be used for various applications other than machine learning applications (e.g., research applications, statistical analysis applications, information tracking applications, etc.). For example, the characteristic curve information determined by the assessment component 102 for any dataset can be used to determine the target data portion (i.e., the criteria defining the amount and/or content of the target data portion) of the respective data samples included in the dataset that satisfy an anonymity criterion, that is an acceptable low probability of identification of the corresponding subjects represented in the target data portion as extracted from the respective data samples. To this end, in some embodiments, the vendor system 101 can be applied to control and regulate sharing of datasets between entities by extracting and sharing only portions of the datasets that satisfy a required or preferred anonymity criterion. For example, in some embodiments, the extraction component 104 can extract portions of respective data samples included in an evaluated dataset associated with a first entity, wherein the extracted portions correspond to the target portion (e.g., in accordance with the criteria defining the amount and/or content of the target data portion). The extraction component 104 can further aggregate the extracted portions into a new dataset that can be provided by the vendor system 101 (e.g., transmitted, sent, made accessible via a network, etc.) to one or more second entities for usage thereof (e.g., in accordance with defined agreements for usage thereof), wherein the new dataset satisfies the required or preferred anonymity criterion. Furthermore, as discussed in greater detail below, the data driven techniques employed by the assessment component 102 for determining respective probabilities of identifying corresponding subjects represented in extracted data portions do not utilize actual unique identifiers for the respective subjects (e.g., subject names, subject identification numbers, etc.). To this end, the vendor system 101 can process datasets that have already been anonymized, thereby enhancing protection of private or sensitive information.

Figure 4:
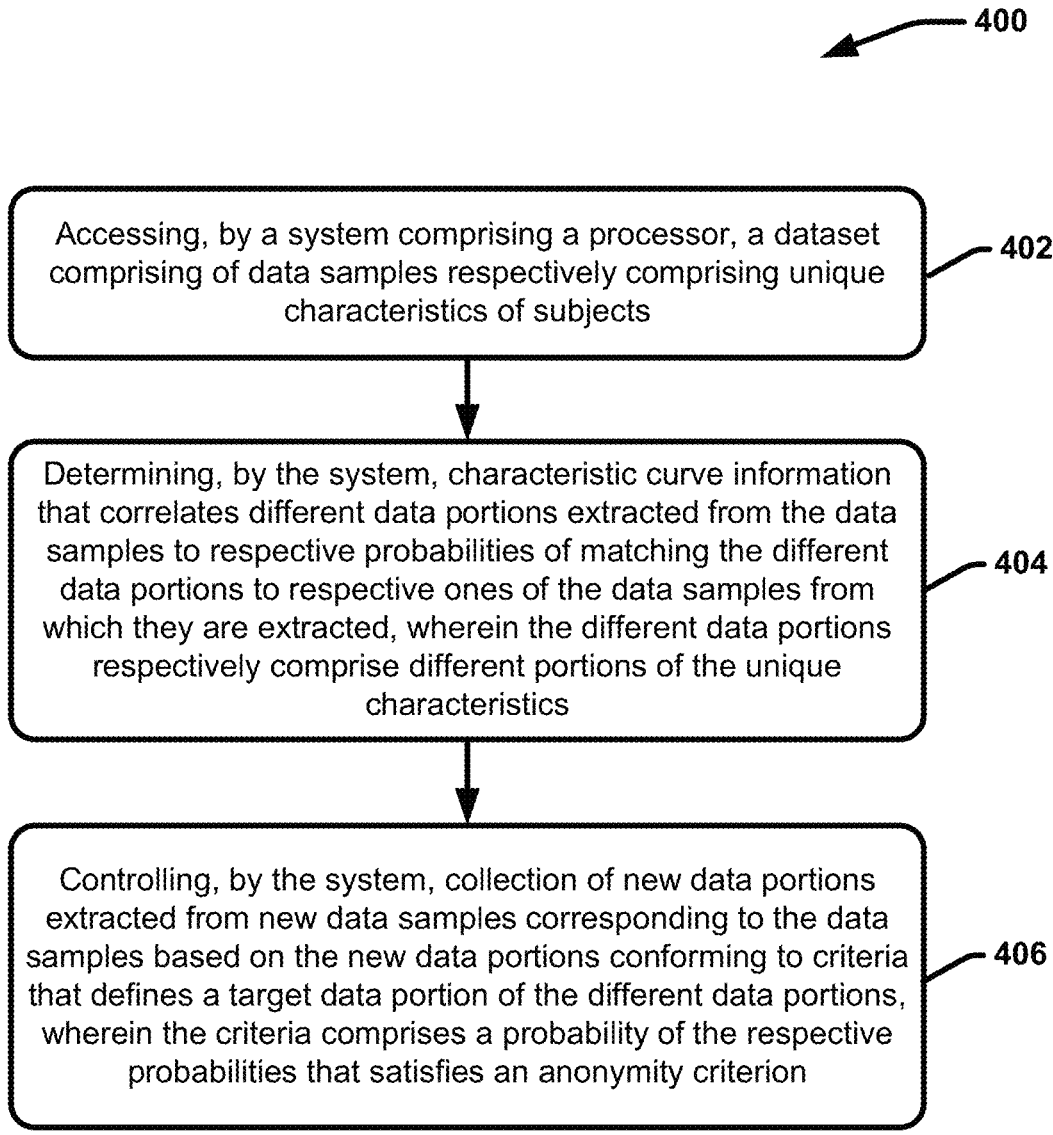
FIG. 4 illustrates a block diagram of an example, non-limiting computer implemented method that facilitates maintaining subject privacy in association with obtaining data subject to privacy concerns, in accordance with one or more embodiments of the disclosed subject matter.

FIG. 4 illustrates a block diagram of an example, non-limiting computer implemented method 400 that facilitates maintaining subject privacy in association with obtaining data subject to privacy concerns, in accordance with one or more embodiments of the disclosed subject matter. Method 400 comprises, at 402 accessing, by a system comprising a processor (e.g., system 100, vendor system 101, or the like), a dataset (e.g., of datasets 118) comprising of data samples respectively comprising unique characteristics of subjects. At 404, method 400 comprises determining, by the system (e.g., via assessment component 102 and extraction component 104), characteristic curve information that correlates different data portions extracted from the data samples to respective probabilities of matching the different data portions to respective ones of the data samples from which they are extracted, wherein the different data portions respectively comprise different portions of the unique characteristics. At 406, method 400 further comprises controlling, by the system (e.g., via collection component 112 or via another suitable control mechanism disclosed herein), collection of new data portions extracted from new data samples corresponding to the data samples based on the new data portions conforming to criteria that defines a target data portion of the different data, wherein the criteria comprises a probability of the respective probabilities that satisfies an anonymity criterion. It should be appreciated that the criteria that defines the target data portion can also define the specific parameters of the target data portion, such as but not limited, a pixel amount, an extraction location or locations of an image, a particular subset of data parameters, and the like.

Figure 5:
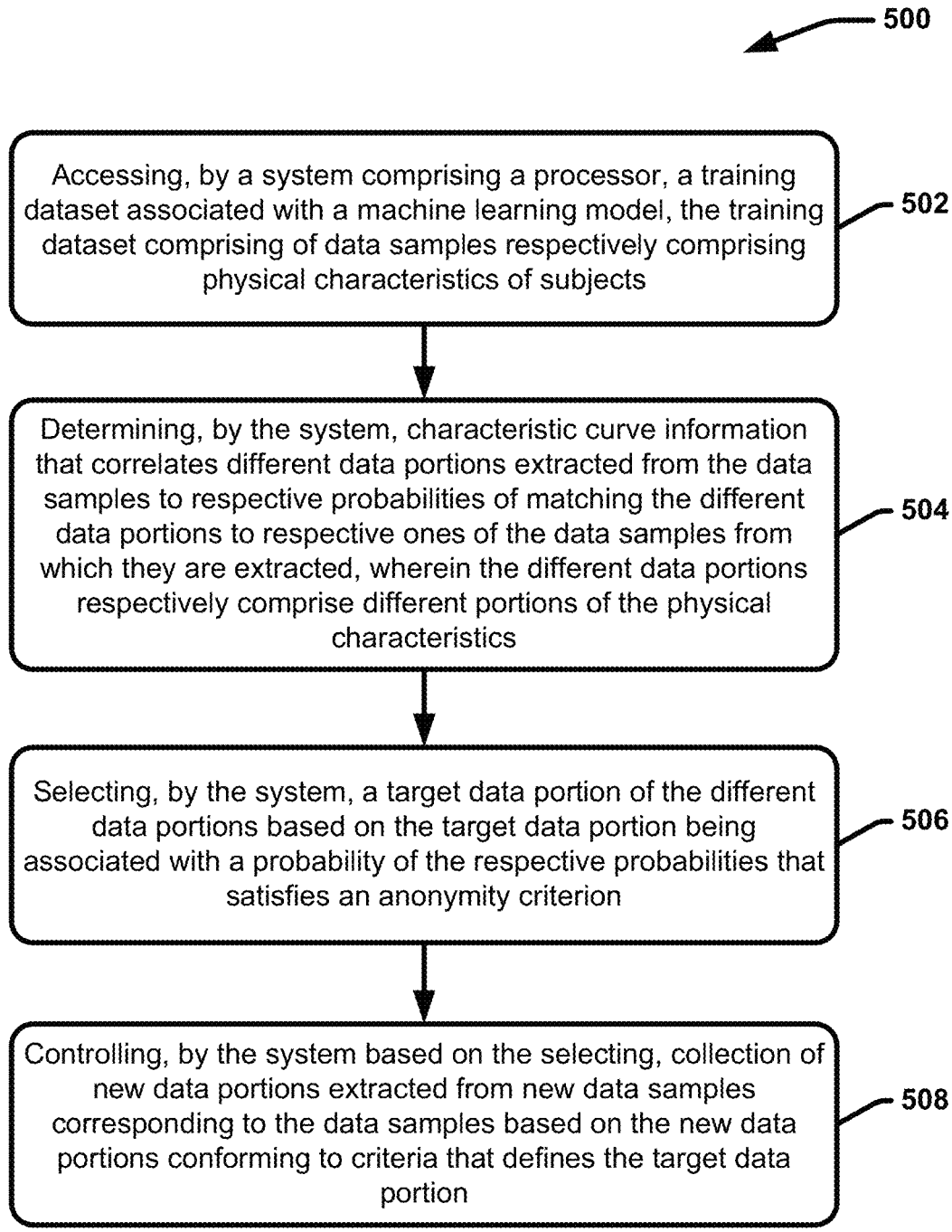
FIG. 5 illustrates a block diagram of an example, non-limiting computer implemented method that facilitates maintaining subject privacy in association with obtaining data for ML applications, in accordance with one or more embodiments of the disclosed subject matter.

FIG. 5 illustrates a block diagram of another example, non-limiting computer implemented method 500 that facilitates maintaining subject privacy in association with obtaining patient data for ML applications, in accordance with one or more embodiments of the disclosed subject matter. Method 500 comprises, at 502 accessing, by a system comprising a processor (e.g., system 100, vendor system 101, or the like), a training dataset (e.g., of datasets 118) comprising of data samples respectively comprising physical characteristics of subjects (e.g., physical/anatomical characteristics of patients or the like). At 504, method 500 comprises determining, by the system (e.g., via assessment component 102 and extraction component 104), characteristic curve information that correlates different data portions extracted from the data samples to respective probabilities of matching the different data portions to respective ones of the data samples from which they are extracted, wherein the different data portions respectively comprise different portions of the physical characteristics. At 506, method 500 comprises selecting, by the system (e.g., via selection component 106), a target data portion of the different data portions based on the target data portion being associated with a probability of the respective probabilities that satisfies an anonymity criterion (e.g., an acceptable low identification probability threshold). At 508, method 500 further comprises controlling, by the system (e.g., via collection component 112 or via another suitable control mechanism disclosed herein) based on the selecting, collection of new data portions extracted from new data samples corresponding to the data samples based on the new data portions conforming to criteria that defines a target data portion.

Example Operating Environments

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 6, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 6:
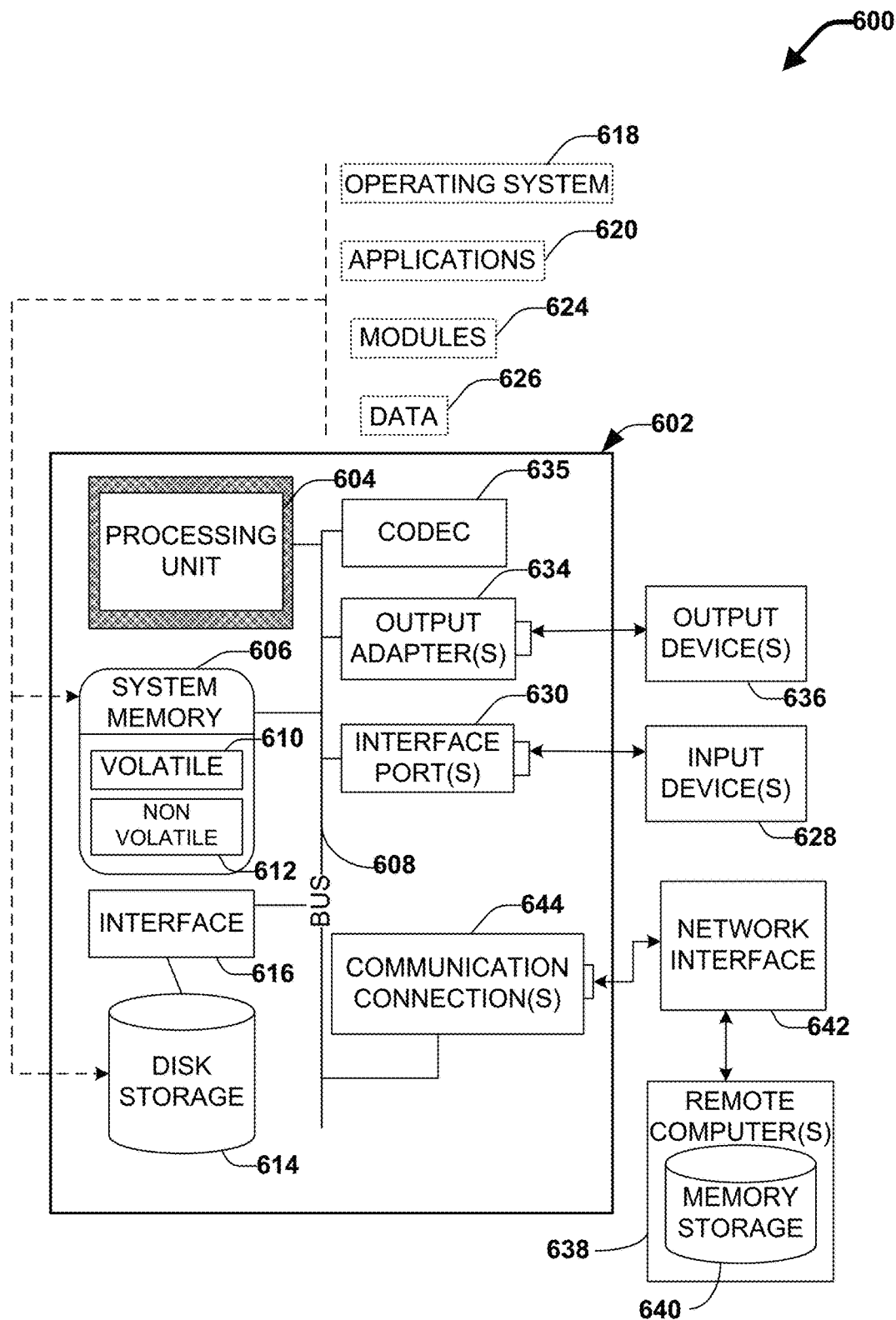
FIG. 6 illustrates a block diagram of an example, non-limiting operating environment in which one or more embodiments described herein can be facilitated.

With reference to FIG. 6, an example environment 600 for implementing various aspects of the claimed subject matter includes a computer 602. The computer 602 includes a processing unit 604, a system memory 606, a codec 635, and a system bus 608. The system bus 608 couples system components including, but not limited to, the system memory 606 to the processing unit 604. The processing unit 604 can be any of various available processors. Dual microprocessors and other multiprocessor architectures also can be employed as the processing unit 604.

The system bus 608 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1364), and Small Computer Systems Interface (SCSI).

The system memory 606 includes volatile memory 610 and non-volatile memory 612, which can employ one or more of the disclosed memory architectures, in various embodiments. The basic input/output system (BIOS), containing the basic routines to transfer information between elements within the computer 602, such as during start-up, is stored in non-volatile memory 612. In addition, according to present innovations, codec 635 can include at least one of an encoder or decoder, wherein the at least one of an encoder or decoder can consist of hardware, software, or a combination of hardware and software. Although, codec 635 is depicted as a separate component, codec 635 can be contained within non-volatile memory 612. By way of illustration, and not limitation, non-volatile memory 612 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 612 can employ one or more of the disclosed memory devices, in at least some embodiments. Moreover, non-volatile memory 612 can be computer memory (e.g., physically integrated with computer 602 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 610 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 602 can also include removable/non-removable, volatile/non-volatile computer storage medium. FIG. 6 illustrates, for example, disk storage 614. Disk storage 614 includes, but is not limited to, devices like a magnetic disk drive, solid state disk (SSD), flash memory card, or memory stick. In addition, disk storage 614 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 614 to the system bus 608, a removable or non-removable interface is typically used, such as interface 616. It is appreciated that disk storage 614 can store information related to a user. Such information might be stored at or provided to a server or to an application running on a user device. In one embodiment, the user can be notified (e.g., by way of output device(s) 636) of the types of information that are stored to disk storage 614 or transmitted to the server or application. The user can be provided the opportunity to opt-in or opt-out of having such information collected or shared with the server or application (e.g., by way of input from input device(s) 628).

It is to be appreciated that FIG. 6 describes software that acts as an intermediary between users and the basic computer resources described in the suitable operating environment 600. Such software includes an operating system 610. Operating system 610, which can be stored on disk storage 614, acts to control and allocate resources of the computer 602. Applications 620 take advantage of the management of resources by operating system 610 through program modules 624, and program data 626, such as the boot/shutdown transaction table and the like, stored either in system memory 606 or on disk storage 614. It is to be appreciated that the claimed subject matter can be implemented with various operating systems or combinations of operating systems.

A user enters commands or information into the computer 602 through input device(s) 628. Input devices 628 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 604 through the system bus 608 via interface port(s) 630. Interface port(s) 630 include, for example, a serial port, a parallel port, a game port, and a universal serial bus (USB). Output device(s) 636 use some of the same type of ports as input device(s) 628. Thus, for example, a USB port can be used to provide input to computer 602 and to output information from computer 602 to an output device 636. Output adapter 634 is provided to illustrate that there are some output devices 636 like monitors, speakers, and printers, among other output devices 636, which require special adapters. The output adapters 634 include, by way of illustration and not limitation, video and sound cards that provide a means of connection between the output device 636 and the system bus 608. It should be noted that other devices or systems of devices provide both input and output capabilities such as remote computer(s) 638.

Computer 602 can operate in a networked environment using logical connections to one or more remote computers, such as remote computer(s) 638. The remote computer(s) 638 can be a personal computer, a server, a router, a network PC, a workstation, a microprocessor based appliance, a peer device, a smart phone, a tablet, or other network node, and typically includes many of the elements described relative to computer 602. For purposes of brevity, only a memory storage device 640 is illustrated with remote computer(s) 638. Remote computer(s) 638 is logically connected to computer 602 through a network interface 642 and then connected via communication connection(s) 644. Network interface 642 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 644 refers to the hardware/software employed to connect the network interface 642 to the bus 608. While communication connection 644 is shown for illustrative clarity inside computer 602, it can also be external to computer 602. The hardware/software necessary for connection to the network interface 642 includes, for exemplary purposes only, internal and external technologies such as, modems including regular telephone grade modems, cable modems and DSL modems, ISDN adapters, and wired and wireless Ethernet cards, hubs, and routers.

Figure 7:
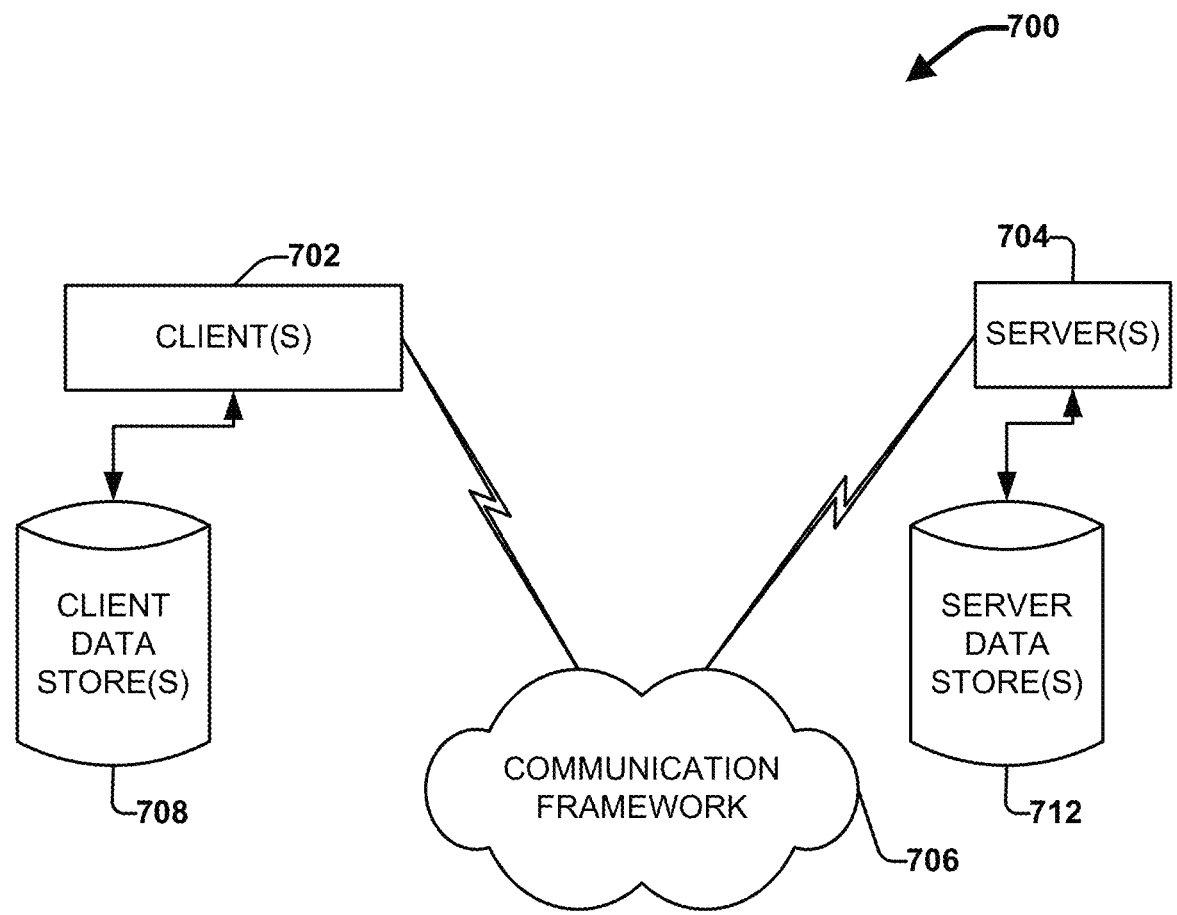
FIG. 7 illustrates a block diagram of another example, non-limiting operating environment in which one or more embodiments described herein can be facilitated.

FIG. 7 is a schematic block diagram of a sample-computing environment 700 with which the subject matter of this disclosure can interact. The system 700 includes one or more client(s) 702. The client(s) 702 (e.g., corresponding to client system 700 in some embodiments) can be hardware and/or software (e.g., threads, processes, computing devices). The system 700 also includes one or more server(s) 704 (e.g., corresponding to vendor system 600 in some embodiments). Thus, system 700 can correspond to a two-tier client server model or a multi-tier model (e.g., client, middle tier server, data server), amongst other models. The server(s) 704 can also be hardware and/or software (e.g., threads, processes, computing devices). The servers 704 can house threads to perform transformations by employing this disclosure, for example. One possible communication between a client 702 and a server 704 may be in the form of a data packet transmitted between two or more computer processes (e.g., comprising feedback information 132 for instance).

The system 700 includes a communication framework 706 that can be employed to facilitate communications between the client(s) 702 and the server(s) 704. The client(s) 702 are operatively connected to one or more client data store(s) 708 that can be employed to store information local to the client(s) 702. Similarly, the server(s) 704 are operatively connected to one or more server data store(s) 712 that can be employed to store information local to the servers 704.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory that stores computer-executable components; and
a processor that executes the computer-executable components stored in the memory, wherein the computer-executable components comprise:
an assessment component that:
accesses a training dataset associated with a machine learning model, the training dataset comprising data samples respectively comprising unique characteristics of subjects, and
determines characteristic curve information that correlates different data portions extracted from the data samples to respective probabilities of matching the different data portions to respective ones of the data samples from which they are extracted, wherein the different data portions respectively comprise different portions of the unique characteristics; and a collection component that controls collection of new data portions extracted from new data samples corresponding to the data samples based on the new data portions being associated with a probability of the respective probabilities satisfies an anonymity criterion.

2. The system of claim 1, wherein the respective probabilities correspond to identification probabilities of determining respective identities of the subjects respectively associated with the different data portions.

3. The system of claim 1, wherein the computer-executable components comprise:
a selection component that selects a target data portion of the different data portions based on the target data portion being associated with the probability that satisfies the anonymity criterion, and wherein the collection component controls the collection of the new based on the new data portions conforming to criteria that defines the target data portion, thereby ensuring the new data portions satisfy the anonymity criterion.

4. The system of claim 3, wherein the new data samples comprise runtime data samples processed by the machine learning model by an external system.

5. The system of claim 4, wherein the collection component receives the new data portions from the external system based on the new data portions conforming to the criteria that defines the target data portion, and wherein the computer-executable components further comprise:
a training component that employs the new data portions to retrain the machine learning model, resulting in an optimized version of the machine learning model.

6. The system of claim 1, wherein the data samples comprise medical images and wherein the unique characteristics comprise physical characteristics of the subjects, and wherein the respective probabilities correspond to probabilities of determining respective identities of the subjects from which the medical images were captured.

7. The system of claim 6, wherein the different data portions correspond to different amounts of pixels.

8. The system of claim 7, wherein the different amounts of pixels are constrained relative to a defined anatomical feature depicted in the medical images.

9. The system of claim 7, wherein the assessment component determines the respective probabilities by, for each pixel amount the different amounts of pixels:
extracting image portions of the pixel amount from respective medical images of the medical images;
determining a number of the medical images capable of being matched to their corresponding extracted image portion of the image portions; and
determining a probability of the respective probabilities for the pixel amount based on the number relative to a total number of the medical images.

10. A method, comprising:
accessing, by a system comprising a processor, a training dataset associated with a machine learning model, the training dataset comprising of data samples respectively comprising unique characteristics of subjects;
determining, by the system, characteristic curve information that correlates different data portions extracted from the data samples to respective probabilities of matching the different data portions to respective ones of the data samples from which they are extracted, wherein the different data portions respectively comprise different portions of the unique characteristics; and controlling, by the system, collection of new data portions extracted from new data samples corresponding to the data samples based on the new data portions being associated with a probability of the respective probabilities satisfies an anonymity criterion.

11. The method of claim 10, wherein the respective probabilities correspond to identification probabilities of determining respective identities of the subjects respectively associated with the different data portions.

12. The method of claim 11, further comprising:
selecting, by the system, a target data portion of the different data portions based on the target data portion being associated with the probability that satisfies the anonymity criterion, and wherein the controlling comprises:
controlling, by the system based on the selecting, the collection of the new data based on the new data portions conforming to criteria that defines the target data portion, thereby ensuring the new data portions satisfy the anonymity criterion.

13. The method of claim 12, wherein the new data samples comprise runtime data samples processed by the machine learning model by an external system.

14. The method of claim 13, further comprising:
receiving, by the system, the new data portions from the external system based on the controlling; and
employing, by the system, the new data portions to retrain the machine learning model.

15. The method of claim 10, wherein the data samples comprise medical images and wherein the unique characteristics comprise physical characteristics of the subjects.

16. The method of claim 15, wherein the different data portions correspond to different amounts of pixels.

17. The method of claim 16, wherein the different amounts of pixels are constrained relative to a defined anatomical feature depicted in the medical images.

18. The method of claim 16, wherein the determining comprises, for each pixel amount the different amounts of pixels:

extracting, by the system, image portions of the pixel amount from respective medical images of the medical images;
determining, by the system, a number of the medical images capable of being matched to their corresponding extracted image portion of the image portions; and
determining, by the system, a probability of the respective probabilities for the pixel amount based on the number relative to a total number of the medical images.

19. A non-transitory machine-readable storage medium, comprising executable instructions that, when executed by a processor, facilitate performance of operations, comprising:
accessing a training dataset associated with a machine learning model, the training dataset comprising data samples respectively comprising unique characteristics of subjects; and
determining characteristic curve information that correlates different data portions extracted from the data samples to respective probabilities of matching the different data portions to respective ones of the data samples from which they are extracted, wherein the different data portions respectively comprise different portions of the unique characteristics; and
controlling collection of new data portions extracted from new data samples corresponding to the data samples based on the new data portions being associated with a probability of the respective probabilities satisfies an anonymity criterion.

20. The non-transitory machine-readable storage medium of claim 19, wherein the operations further comprise:
selecting a target data portion of the different data portions based on the target data portion being associated with the probability that satisfies an anonymity criterion; and
controlling collection of the new data portions based on the new data portions conforming to criteria that defines the target data portion.

* * * * *